United States Patent [19]

Sabia et al.

[11] 4,376,231
[45] Mar. 8, 1983

[54] COMMUNICATION CABLE SEALED WITH A RE-ENTERABLE SEALING TAPE

[75] Inventors: Raffaele A. Sabia, Atlanta; James L. Williams, Doraville, both of Ga.

[73] Assignee: Bell Telephone Laboratories, Incorporated, Murray Hill, N.J.

[21] Appl. No.: 295,006

[22] Filed: Aug. 21, 1981

Related U.S. Application Data

[63] Continuation of Ser. No. 111,907, Jan. 14, 1980, abandoned.

[51] Int. Cl.³ .................. B32B 9/00; B32B 15/00; B65H 69/02; H02G 15/08
[52] U.S. Cl. .................................. 174/92; 156/158; 156/327; 156/334; 428/372; 428/389; 428/390
[58] Field of Search .............. 428/389, 390, 379, 357, 428/364, 372; 174/91, 92, 84; 156/157, 158, 304, 334, 333, 327; 260/42.22, 42.43, 42.46, 28.5 A

[56] References Cited

U.S. PATENT DOCUMENTS

| 2,462,977 | 3/1949 | Kitchin et al. | 156/49 X |
| 2,827,098 | 3/1958 | Semegen et al. | 156/306.9 |
| 2,864,882 | 12/1958 | Snell | 156/49 X |
| 3,271,505 | 9/1966 | Dellett et al. | 174/92 X |
| 3,337,681 | 8/1967 | Smith | 174/92 |
| 3,514,417 | 5/1970 | Bickel et al. | 260/42.46 X |
| 3,614,298 | 10/1971 | Thompson et al. | 174/92 |
| 3,767,608 | 10/1973 | Hand | 260/42.46 |
| 3,796,823 | 3/1974 | Wright et al. | 174/92 |
| 4,216,351 | 8/1980 | Brandeau | 174/92 |

Primary Examiner—Lorraine T. Kendell
Attorney, Agent, or Firm—James H. Fox; Peter V. D. Wilde

[57] ABSTRACT

An improved, solvent-resistant sealing compound is described. It is an acrylic rubber composition adapted particularly for sealing splice case closures around telecommunications cable.

3 Claims, 1 Drawing Figure

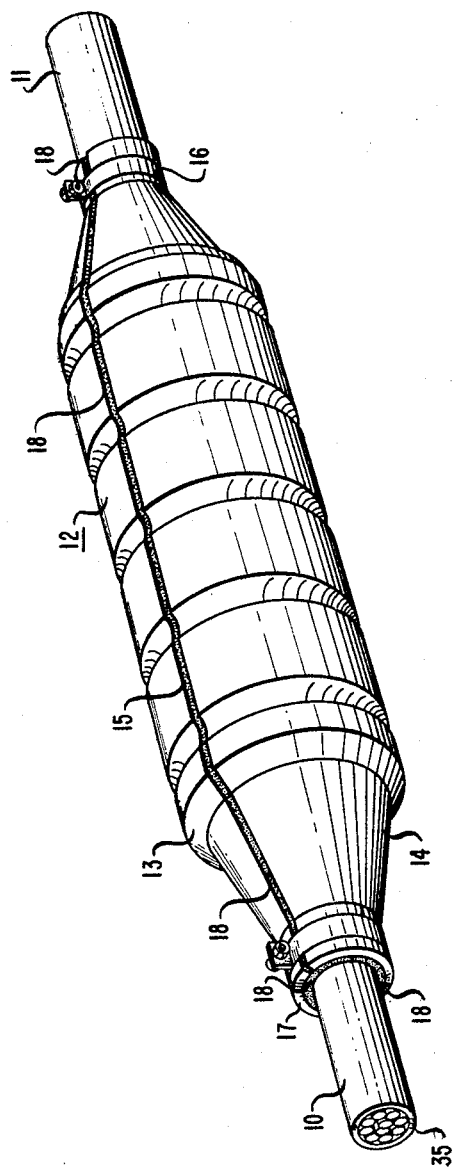

COMMUNICATION CABLE SEALED WITH A RE-ENTERABLE SEALING TAPE

This is a continuation of application Ser. No. 111,907, filed Jan. 14, 1980 and now abandoned.

BACKGROUND OF THE INVENTION

Rubber compounds have been used in a variety of applications as sealing materials and are used prominently in the communications industry to provide gas tight seals in waterproof cables. In particular, cable splices enclosed with splice closures need to be sealed where the splice closure halves are joined and where the closure is joined to the ends of the cables being spliced. If the cable is pressurized the joint should be gas tight.

Rubber sealing compounds are available for this and related applications. However, the sealing compound that is conventionally used for sealing telecommunications cable softens on exposure to petrochemicals, with attendant loss of gas pressure. Water intrusion then destroys the electrical performance of the cable. Similarly, this sealing compound is affected by the grease contained in the waterproof cable, and also by the encapsulant used conventionally to fill the splice closure to prevent water entry.

In these cases, when the sealing material dissolves, it not only ceases to function as a seal, but it seeps into the splice closure, interfering with later reentry of the splice for service modifications or repair.

Other qualities of a desirable sealing material for this and related applications are low flame spread and low electrical conductivity.

SUMMARY OF THE INVENTION

We have devised a new sealing compound with the foregoing as design objectives. It is an acrylic rubber composition specifically formulated for sealing splice closures around telecommunications cable.

BRIEF DESCRIPTION OF THE DRAWING

The FIGURE is a perspective representation of a splice between ends of a telecommunications cable, showing a splice closure sealed along the closure halves and to the cable with a sealing tape.

DESCRIPTION OF SPECIFIC EMBODIMENTS

The sealing compound according to the invention is a modified acrylic rubber having the following composition:

TABLE 1

| Ingredient | Parts by Weight | | |
| --- | --- | --- | --- |
| | Min. | Preferred | Max. |
| Acrylic rubber | 22 | 24.7 | 27 |
| Polyisobutylene | 7 | 8.7 | 10.5 |
| Carbon black | 5 | 10.0 | 11 |
| Tricresyl phosphate | 10 | 12.0 | 14 |
| Hydrated alumina | 40 | 44.6 | 50 |

The acrylic rubber is resistant to petrochemical solvents. Specific materials suitable for this ingredient are T-76, produced by Thiokol Chemical Corp., Hycar 4043, Hycar 4054, and Hycar 4054-x-2 available from B. F. Goodrich Corp. Hycar 4054 and Hycar 4054-x-2 are especially suitable since they exhibit a glass transition temperature below the temperature range to which telecommunications cable is normally exposed in service. As a preferred case therefore, the rubber ingredient advantageously has a glass transition temperature below −20 degrees C. An acrylic rubber without the crosslinking agent conventionally present in the material would be satisfactory.

The polyisobutylene (PIB) is included for tack control, and in our composition is Vistanex LM-MH, available from Exxon Chemical Corp. Vistanex LM-MS and other PIB will be suitable, as well as butyl rubber.

The hydrated alumina is included as a flame retardant filler. The specific material used is Lubral Coated H-710, available from ALCOA Chemicals. In general, any nonconductive, fine particle filler may be used but accompanied by some loss of fire retardancy. Typical substitutes include $CaCO_3$, silica, Dawsonite (a flame retardant filler), titania, zirconia, molybdenum oxide, iron oxide, antimony oxide, talc.

The tricresyl phosphate used is Kronitex TCP, available from FMC Corp. This ingredient is a compatibilizer, essentially insoluble in hydrocarbons, included to control syneresis of the polyisobutylene ingredient. Other aryl phosphates or triaryl phosphates such as kronitex 100 (FMC) are suitable. Aliphatic phosphates such as trioctyl phosphate are soluble and are therefore less acceptable. We have also used chlorinated paraffin oils to control syneresis in these materials, or to replace part of the PIB for tack control and syneresis.

Carbon black is an effective extrusion aid for processing the material into cord or tape. It adds smoothness, uniformity and gloss. It also adds to the uv stability characteristics of acrylic rubbers.

The particular application for which this sealing material was designed is represented in the FIGURE. Two ends of a telephone cable, 10 and 11, are shown spliced together with a splice closure 12. The multipairs of individual wires are joined together inside the closure. The closure typically consists of two halves, 13 and 14, joined together at 15, and fastened with an appropriate fastener 16. The end portion of the closure 17 is fitted to the cable end as shown. This portion, and the seam 15, are sealed with a sealing material 18 to give a watertight, or gas-tight seal as described earlier. The closure may be filled with a splice closure filling compound to aid in preventing intrusion of water into the closure. The sealing material 18 is typically applied in the form of a cord and tape, along the closure halves and wound around the cable end, as shown, with the halves of the closure and cable ends fitted and fastened together. The sealing cord and tape are made from a compound having the composition described herein.

To demonstrate the effectiveness of this sealing compond, cast iron, aluminum, and plastic splice cases were sealed at room temperature and cycled 100 times from −40 degrees F. to +140 degrees F. without failure of the seal. The splice case was reentered, resealed, and recycled as before, again without failure.

To test the low temperature sealing properties of the material, the compound itself and the plastic closure were cooled to 30 degrees F. The seal was made and tested for 100 cycles as before. The closure remained airtight.

In other experiments the material was used successfully for watertight seals.

Whereas the specific demonstrations of the effectiveness of the sealing material are related to cable technology, other applications exist which require sealing materials with these desirable characteristics. All those which take advantage of the teachings through which this invention has advanced the art are within the scope of this invention. Although, in a broad sense, the invention is directed to a sealing composition, per se, it should be pointed out that the composition can be formed advantageously into a cord or tape. The cord or tape has desirable handling characteristics and shelf life. The composition also has an extended life in service, and is designed to maintain a sealing function for a period in excess of ten years under outdoor conditions.

It should also be understood that, while the particular embodiment described in connection with the FIGURE makes reference to telephone cable, the invention is applicable to communications cable of various kinds, including light-guide cable. However, as just mentioned, in a broader aspect the invention is directed to a sealing material, per se, used wherever the particular properties described prove advantageous.

With the use of a filler such as aluminia trihydrate, while at the same time minimizing the amount of carbon black, two other objectives are attained. The formulation will exhibit low conductivity (minimizing the carbon black) and flame retardancy (maximizing the alumina hydrate content). The material properties attained meet the criteria presently set for the outside telephone plant (volume resistivity $> 10^8$ ohm cm) and new equipment building standards (OI$>$28).

Various additional modifications and extensions of this invention will become apparent to those skilled in the art. All such variations and deviations which basically rely on the teachings through which this invention has advanced the art are properly considered to be within the spirit and scope of this invention.

I claim:

1. A communications cable comprising two cable ends joined together to form a splice, and an airtight cable splice closure covering the splice and sealed to the two ends of the cable with a sealing cord or tape, with said closure comprising mating portions joined together at a re-enterable and re-sealable seam sealed with said sealing cord or tape, said cord or tape comprising the following ingredients in the approximate amounts indicated:

|  | Range Parts by Weight | |
| --- | --- | --- |
|  | Min. | Max. |
| Acrylic rubber | 22 | 27 |
| Polyisobutylene | 7 | 10.5 |
| Carbon black | 5 | 11 |
| Tricresyl phosphate or chlorinated paraffin | 10 | 14 |
| Nonconductive, fine particle filler | 40 | 50 |

2. The cable of claim 1 wherein the seam sealed by said sealing cord or tape remains airtight when said cable splice closure is sealed at room temperature or at 30 degrees F. and cycled 100 times from $-40$ degrees F. to $+140$ degrees F.

3. The cable of claim 1 wherein said ingredients are:

|  | Parts by Weight |
| --- | --- |
| Acrylic rubber | 24.7 |
| Polyisobutylene | 8.7 |
| Hydrated alumina | 44.6 |
| Tricresyl phosphate | 12.0 |
| Carbon black | 10.0 |

* * * * *